(12) United States Patent
Faulkner

(10) Patent No.: US 9,756,286 B1
(45) Date of Patent: Sep. 5, 2017

(54) COMMUNICATION EVENT

(71) Applicant: Microsoft Technology Licensing, LLC, Redmond, WA (US)

(72) Inventor: Jason Thomas Faulkner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/230,202

(22) Filed: Aug. 5, 2016

(51) Int. Cl.
*H04N 7/14* (2006.01)
*H04L 29/06* (2006.01)
*H04N 7/15* (2006.01)

(52) U.S. Cl.
CPC ........... *H04N 7/147* (2013.01); *H04L 65/403* (2013.01); *H04L 65/4076* (2013.01); *H04N 7/15* (2013.01)

(58) Field of Classification Search
CPC .... H04N 7/155; H04N 65/4023; H04N 5/232; H04N 19/51; H04N 19/65; H04N 19/166; H04N 19/172; H04N 19/176; H04N 19/31; H04N 19/463; H04N 7/152; H04N 21/00; H04N 2007/145; H04N 7/15
USPC .......................................... 348/14.01–14.16
See application file for complete search history.

(56) References Cited

U.S. PATENT DOCUMENTS

| 6,611,281 | B2 | 8/2003 | Strubbe | |
|---|---|---|---|---|
| 7,057,636 | B1 | 6/2006 | Cohen-Solal et al. | |
| 8,169,463 | B2 | 5/2012 | Enstad et al. | |
| 8,581,956 | B2 | 11/2013 | Robinson et al. | |
| 8,581,958 | B2 * | 11/2013 | Baker | H04N 7/152 348/14.08 |
| 8,773,493 | B2 * | 7/2014 | Lee | H04N 7/15 348/14.02 |
| 8,773,499 | B2 | 7/2014 | Watson et al. | |
| 8,842,161 | B2 | 9/2014 | Feng et al. | |
| 9,001,183 | B2 | 4/2015 | Mauchly | |
| 2008/0239062 | A1 * | 10/2008 | Civanlar | H04N 7/152 348/14.09 |
| 2013/0271559 | A1 | 10/2013 | Feng et al. | |
| 2015/0215581 | A1 | 7/2015 | Barzuza et al. | |
| 2015/0264378 | A1 * | 9/2015 | Cipolli | H04L 1/1607 375/240.12 |
| 2016/0057391 | A1 * | 2/2016 | Block | H04L 65/4023 348/14.07 |
| 2016/0134838 | A1 | 5/2016 | Tangeland et al. | |

OTHER PUBLICATIONS

"RealPresence Group Series", Published on: Feb. 7, 2015 Available at: http://www.polycom.com/products-services/hd-telepresence-video-conferencing/realpresence-room/realpresence-group-series.html.
Kjesbu, Snorre, "Give Your Video Conference Room a "Stage" with Cisco PresenterTrack", Published on: May 9, 2016 Available at: http://blogs.cisco.com/collaboration/give-your-video-conference-room-a-stage-with-cisco-presentertrack.
"Polycom EagleEye Director", Published on: Feb. 7, 2015 Available at: http://www.polycom.com/products-services/hd-telepresence-video-conferencing/realpresence-accessories/realpresence-accessories-eagle-eye-director.html.

\* cited by examiner

Primary Examiner — Binh Tieu

(57) ABSTRACT

An established communication event is conducted between existing participants by transmitting and receiving video streams via a communication network between their user devices. A user interface of a new participant is controlled to operate in a late-to-join mode initially if that participant satisfies a late-to-join condition. In response to expiry of an initial duration, the user interface automatically switches to an active speaker mode instead.

20 Claims, 12 Drawing Sheets

COMMUNICATION EVENT

TECHNICAL FIELD

The present invention relates to a communication event conducted by transmitting and receiving video streams via a communication network between user devices operated by participants of the communication event, and displaying video images derived from those video streams at those user devices.

BACKGROUND

Voice over internet protocol ("VoIP") communication systems allow a user of a device to conduct a communication event, such as a call, via a packet-based communication network such as the Internet. To use VoIP, the user installs and execute client software on a user device. The client software provides the VoIP connections as well as other functions such as registration and authentication. In a call conducted using the clients, audio data is transmitted and received between the clients so that users participating in the call can hear each other.

In addition to voice communication, the client may also provide video calling functionality, such that video streams carrying video images of the participants can be transmitted and received between the clients via the network. The participants are able to view the video images of the other participants in addition hearing their voices. This provides a more natural form of communication between the participants, as facial expressions are also communicated, thereby making video calls more comparable to a face-to-face conversation. The video images can be call video images i.e. images of the users themselves captured at their devices, but they can also be other types of video image (that is, other types of video content) in order to implement other communication event modalities, such as screen sharing, document sharing, whiteboard sharing etc. For example, at least one of the video streams may carry a video image of content currently being displayed one of the participant's displays so that it is visible to the other participants.

SUMMARY

An established communication event is conducted between existing participants by transmitting and receiving video streams via a communication network between their user devices. A user interface of a new participant is controlled to operate in a late-to-join mode initially if that participant satisfies a late-to-join condition. In response to expiry of an initial duration, the user interface automatically switches to an active speaker mode instead.

A first aspect of the present invention is directed to a method of controlling a user interface of a user device operated by a new participant of an established communication event, the established communication event being conducted between a plurality of existing participants by transmitting and receiving video streams via a communication network between user devices operated by those existing participants, the method comprising steps of:
 receiving a notification of the new participant joining the established communication event;
 determining, based on the received notification, whether the new participant satisfies a late-to-join condition; and
 if the late-to-join condition is determined to be satisfied:
 controlling the user interface to operate in a late-to-join mode for an initial duration, and in response to expiry of the initial duration, controlling the user interface to operate in an active speaker mode instead (i.e. switching from the late-to-join mode to the active speaker mode).

controlling the user interface to operate in the active speaker mode comprises selecting for the new participant, based on audio data generated at the user device of an actively speaking one of the participants: one of the video streams of the actively speaking participant, or an avatar image representing the actively speaking participant, thereby causing the user interface to display the selected avatar image or a video image derived from the selected stream.

The terms "active-speaker mode" and "follow-the-action mode" are used interchangeably herein to refer to a mode in which the displaying of video images or avatars is driven primarily, but not necessarily exclusively, on active speaker identification, implemented by applying speech detection to audio data of the participants.

Controlling the user interface to operate in the late-to-join mode may comprise one of the video streams of a non-speaking participant or an avatar image of the non-speaking participant, thereby causing the user interface to display the selected avatar image or a video image derived from the selected stream of the non-speaking participant.

A video image can be a "moving image", i.e. a sequence of frames (i.e. static images) to be played out in quick succession to give the impression of movement during a communication event, or it can be a image still from a moving image (that is, a static image derived from a moving image). Unless otherwise indicated, any references to "an image" below denote a video image in this sense. The phrase "displaying a video stream" mean displaying a video image derived from that video stream. A video image of the communication event means a video image derived from one of the video streams of the communication event. Still images are potential views that can be displayed as part of a late to join experience. For example, a screen capture of a recent high activity view content sharing.

The video streams can carry video images of the users themselves ("call video image") but the present invention is not limited to this; at least one may carry a video image of another type of content, such as a shared content video image ("shared content media image"). In this respect, whilst a "call video image" can be an image of one or more user's, the invention is not limited to this—at least one of the video images could be of shared content. For example, in-app document sharing/editing, or screen sharing. From the perspective of the new participant, the shared content appears to an extent as a "participant" in the communication event in its own right, referred to as "content-as-a-participant", although it is in fact video content supplied by one of the actual participants (i.e. one of the user's participating in the communication event). For the avoidance of any doubt, it is noted that the term "participant" when used in the Claims means a user participating in the communication event.

For example, one or more dominant activity image stream(s) plus one or more content media streams could be displayed.

As will be apparent, "initial" in this context is from the perspective of the new user, and is a time interval commencing when he as joined (it does not refer to the very start of the communication event, which is before he has joined).

In embodiments, controlling the user interface to operate in the late-to-join mode may comprise selecting for the new participant one or more of said video streams and/or one or more avatar images independently of any audio data generated at the user devices, thereby causing the user interface to display the selected avatar images or one or more video images derived from the selected video streams for at least part of the initial duration.

Alternatively, or in addition, no more than a maximum number of video images derived from the video streams may be displayed by the user interface at any one time when operating in the active speaker mode, and more than that maximum number of video images may be displayed simultaneously by the user interface operating in the late-to-join mode at least once during the initial duration.

Alternatively, or in addition, controlling the user interface to operate in the late-to-join mode may comprise controlling the user interface to display over the course of the initial duration, for every one of the existing participants, a respective video image derived from one of the video streams or a respective avatar image (not necessarily simultaneously).

In embodiments, the late-to-join condition may be based on at least one of an elapsed time of the communication event at a join time of the new participant. Alternatively, or in addition, it may be based on a number of existing participants of the communication event at the join time.

In other words, a late joiner may be classes as such because they have joined at a late stage in time, when there are a large number of existing participants already, or both.

The method may further comprise a step of controlling the user interface to operate in the active speaker mode immediately if the late-to-join condition is determined not to be satisfied. "Immediately" means the active speaker mode is the first selected mode i.e. the late join mode is not selected initially.

The steps may be implemented at a relay node other than the new participant's user device.

For example, the controlling step may be implemented by transmitting from the relay node via the network to the new participant's user device any of the video streams needed by the user interface operating in the active speaker mode to display the image (and only that/those video stream(s)). No video streams are transmitted for as long as only an avatar image(s) is being displayed by the user interface.

The relay node may be a relay server, or the user device operated by one of the existing participants.

Wherein the steps are implemented by the new participant's user device.

For example, the user device may subscribe to the video stream of the actively speaking participant when the user interface is operating in the active-speaker mode, wherein the user device receives the subscribed-to stream from a relay node via the network.

In the late-to-join mode, the user device may subscribe to all (or some) of the video streams, wherein the user device receives the subscribed-to video streams from the relay node via the network. For example, at least one video stream of a non-speaking participant.

In the late-to-join mode, the user device may subscribe to at least one of the video streams of a non-speaking participant wherein the user device receives the subscribed-to video stream from the relay node via the network.

The user device can subscribe to a given stream(s) by transmitting at least one active speaker subscription message to the relay node.

At least one of the displayed images may be a call video image, derived from one of the video streams, of the actively speaking participant and is selected for the subsequent duration based on the active speaker's audio data.

At least one video images may be displayed by the user interface operating in the late-to-join mode during the initial duration is a call video image of a participant who is not actively speaking at that time.

Different video or avatar images may be displayed at different times during the initial duration by the user interface operating in the late-to-join mode.

The user device operated by at least one of the plurality existing participants of the communication event may, when the new participant joins, not be transmitting a video stream, and an avatar image representing the additional participant may be displayed at the new participant's user device by the user interface operating in the late-to-join mode for at least part of the initial duration, which is not displayed by the user interface when operating in the active speaker mode.

At least one of the video streams may carry a modality indicator and the method comprises detecting the modality indicator in that stream; wherein a video image derived from that video stream is displayed by the user interface operating in the late-to-join mode for at least part of the initial duration; and wherein the detection of the modality indicator prevents any video image derived from that video stream from being displayed by the user interface when operating in the active speaker mode.

A second aspect of the invention is directed to a network node for controlling a user interface displayed to a new participant of an established communication event, the established communication event being conducted between a plurality of existing participants by transmitting and receiving video streams via a communication network between user devices operated by those existing participants, the network node comprising:

an input configured to receive a notification of a new participant joining the established communication event;

a controller configured to implement steps of:

determining, based on the received notification, whether the new participant satisfies a late-to-join condition; and if the late-to-join condition is determined to be satisfied: controlling the user interface to operate in a late-to-join mode for an initial duration, and in response to expiry of the initial duration, controlling the user interface to operate in an active speaker mode instead;

wherein controlling the user interface to operate in the active speaker mode comprises selecting for the new participant, based on audio data generated at the user device of an actively speaking one of the participants: one of the video streams of the actively speaking participant, or an avatar image representing the actively speaking participant, thereby causing the user interface to display the selected avatar image or a video image derived from the selected stream.

The network node can be a relay node or a user device operated by the new participant, for example:

A fourth aspect of the present invention is directed to a method of managing an established communication event being conducted between a plurality of existing participants by transmitting and receiving video streams via a communication network between user devices operated by those existing participants, the method comprising steps of:

receiving a notification of a new participant joining the established communication event;

determining for a display area a minimum number of images of the communication event to be displayed to the new participant for an initial duration of the communication event ("late-to-join phase");

based on that determining step, controlling a display of a user device available to the new participant to display, in a display area of the display, for the initial duration of the communication event, at least two images of the communication event, each of those images being a video image derived from one of the video streams or an avatar image representing one of the participants, such that the total number of images of the communication event displayed at that user device in said display area is no less than the minimum number determined for the initial duration at all times during the initial duration;

determining for the display area a maximum number of video images to be displayed to the new participant for a subsequent duration of the communication event;

controlling the display of the new participant's user device to display, in said display area, for a subsequent duration of the communication event ("follow-the-action phase"), at least one image of the communication event, that image being a video image derived from at least one of the video streams or an avatar image representing one of the participants, such that the total number of video images of the communication event displayed at that user device in said display area does not exceed the maximum number determined for the subsequent duration at all times during the subsequent duration.

An image of the communication event means either a video image derived from one of the video streams or an avatar image representing one of the participants (e.g. an audio-only participant, who is not transmitting a video stream).

In other words, in accordance with the first aspect of the present invention:

for the initial duration, a lower limit is imposed on the total number of displayed images of the communication event (video images and/or avatar images), such that the total number of images in the display area does not fall below this at any time during the initial duration;

for the subsequent duration, an upper limit is imposed on the number of displayed video images specifically (i.e. specifically images that are derived from the video streams, as opposed to avatar images), such that the number of video images does not exceed this upper limit at any time (though any number of avatar images may be displayed in the display area in addition to this).

Preferably the maximum number determined for the subsequent duration is less than the minimum number determined for the initial duration.

For example, in the embodiments described below, for the initial duration (late-to-join phase), no less than three images of the communication even are displayed for this duration, and these can be video images, avatar images or a combination of both; for the subsequent duration (follow-the-action phase), at most two video images are displayed in the display area for this duration, plus any number of avatar on top of this.

The display of the new participant's user device has a total available display area. The display area refer to above can be all of the total display area, or just a portion. In any event, the display area is the same for the initial and subsequent duration.

In embodiments of the present invention, the steps may be implemented at a relay node other than the new participant's user device. For example, the controlling steps may be implemented by transmitting from the relay node via the network to the new participant's user device, in the first and second controlling steps, any of the video streams needed to display the at least two and the at least one images of the communication event respectively (and only those video streams).

For example, the relay node may be a relay server, or it may be the user device operated by one of the existing participants.

Alternatively, the steps may be implemented by the new participant's user device.

The at least one image displayed in the subsequent duration may be a call video image of at least one of the participants derived from one of the video streams. For example, the call video image may be a video image of an actively speaking one of the participants and is selected for the subsequent duration based on associated voice data.

Alternatively, or in addition, the at least one image may be a video image selected for the subsequent duration based on its visual content.

Over the initial duration, video images derived from every one of the video streams may be displayed at the user device in said display area.

At least one of the images displayed in said display area during the initial duration may be a call video image, derived from one of the video streams, of a participant who is not actively speaking at that time.

The steps may further comprise determining a maximum number of images of the communication event to be displayed for the initial duration, wherein the new participant's user device is controlled in the first controlling step such that the number of images of the communication event displayed by that user device in said display area remains between the determined minimum and maximum numbers at all times during the initial duration.

Different images of the communication event may be displayed at different times during the initial duration.

The steps may comprise determining a minimum number of images of the communication event to be displayed for the subsequent duration, wherein the new participant's user device is controlled in the second controlling step such that the total number of images of the communication event displayed in said display area is no less than the minimum number determined for the subsequent duration at all times during the subsequent duration.

The minimum number may be determined for the initial duration by selecting for said display area one of a set of predetermined display layouts having that number of display regions.

The number of said participants throughout the subsequent duration may remain at least as great as throughout the initial duration.

The user device operated by at least one of the existing participants may, when the new participant joins, not be transmitting a video stream (audio-only participant), wherein an avatar image representing the additional participant is displayed at the new participant's user device in said display area for at least part of the initial duration, which is not displayed in said display area at any time during the subsequent duration (though it may or may not be displayed outside of the available display area if said display area is less than the total display area). Alternatively, it may be displayed in the subsequent duration, such that is occupied a smaller portion of the display area in the subsequent duration than the initial duration.

At least one of the video streams may carry a modality indicator and the method comprises detecting the modality indicator in that stream. A video image derived from that video stream may be displayed in said display area at the new participant's user device for at least part of the initial duration. The detection of the modality indicator may prevent any video image derived from that video stream from being displayed at the new participant's user device in said display area at any time during the subsequent duration (though it may or may not be displayed outside of the available display area if said display area is less than the total display area).

At least one of the images of the communication event displayed in the initial duration may be a first avatar image representing one of the participants, the at least one image of the communication event displayed in the subsequent duration may be a second avatar image representing that same participant, wherein the second avatar image occupied a smaller portion of the display area than the first avatar image. That is, the avatar representation of that participant may be more prominent in the initial duration than in the subsequent duration.

A fifth aspect of the present invention is directed to a network node for managing an established communication event being conducted between a plurality of existing participants by transmitting and receiving video streams via a communication network between user devices operated by those existing participants, the network node comprising: an input configured to receive a notification of a new participant joining the established communication event; a controller configured to: determine for a display area (i) a minimum number of images of the communication event to be displayed to the new participant for an initial duration of the communication event, and (ii) a maximum number of video images to be displayed to the new participant for a subsequent duration of the communication event; and a stream selector configured to, based on the determined minimum number: (i) control a display of a user device available to the new participant to display, in a display area of the display, for the initial duration of the communication event, at least two images of the communication event, each of those images being a video image derived from one of the video streams or an avatar image representing one of the participants, such that the total number of images of the communication event displayed at that user device in said display area is no less than the minimum number determined for the initial duration at all times during the initial duration, and (ii) based on the determined maximum number, control the display of the new participant's user device to display, in said display area of the display, for a subsequent duration of the communication event, at least one image of the communication event, that image being a video image derived from one of the video streams or an avatar image representing one of the participants, such that the total number of video images of the communication event displayed at that user device in said display area does not exceed the maximum number determined for the subsequent duration and the display area at all times during the subsequent duration.

The network node may be a relay node or a user device, for example.

In embodiments, the network node can be configured to implement any of the method steps disclosed herein.

For the initial duration, at least one selectable user interface element may be displayed outside of said display area, which is displayed within said display area for the subsequent duration (e.g. in a portion of the available displayed area rendered available by the reduction in the number of displayed video images).

Said display area can be a total available display area of the display.

Alternatively, it may be only part of the total available display area.

To provide what is referred to herein as a "staged-content" view, said display area in which the selected video stream(s) may be only a part of the total available display area. A shared content video image of the communication event (generated locally at the participant's own user device, or derived from another of the video streams of another of the participants) so as to occupy another, larger part of the total display area (i.e. having a greater area).

A self-video image of the new participant, generated locally at his device, may also be displayed on the display outside of said display area in which the selected video stream(s) are displayed.

Note "notification" in this context refers to a signal informing a controlling entity that is implementing the method of the new participant, such as a system notification, as opposed to a visual notification that is displayed to one of the participants. However, in some embodiments, a visual notification of the new participant may also be displayed at the user devices of the existing participants.

Another aspect of the present invention is directed to a computer program product comprising code stored on a computer readable storage medium and configured when executed to implement any of the functionality disclosed herein. The computer readable storage medium can for example be formed of one or more electronic storage devices (such as electronic, magnetic and/or optical storage), as distinct from a signal bearing medium.

User or system tagged activity can also be referenced for late to join priority. High activity content sharing activity can trigger priority for late to join grid view population for follow the action and attendee awareness on join.

A sixth aspect of the present invention is directed to a method of managing an established communication event being conducted between a plurality of existing participants by transmitting and receiving video streams via a communication network between user devices operated by those existing participants, the method comprising steps of: receiving a notification of a new participant joining the established communication event; determining a minimum number of video images of the communication event to be displayed to the new participant for an initial duration of the communication event; and based on the determining step:

controlling a display of a user device available to the new participant to display, in a display area of the display, for the initial duration of the communication event, at least two video images derived from at least two of the video streams, such that the total number of video images of the communication event displayed at that user device in said display area is no less than the minimum number determined for the initial duration at all times during the initial duration, and controlling the display of the new participant's user device to display, in said display area of the display, for a subsequent duration of the communication event, at least one video image derived from at least one of the video streams, such that the total number of video images of the communication event displayed at that user device in said display area is less than the minimum number determined for the initial duration at all times during the subsequent duration.

BRIEF DESCRIPTION OF FIGURES

For a better understanding of the present invention, and to show how embodiments of the same can be carried into effect, reference is made to the following figures in which.

DETAILS DESCRIPTION OF PREFERRED EMBODIMENTS

Figure 1:
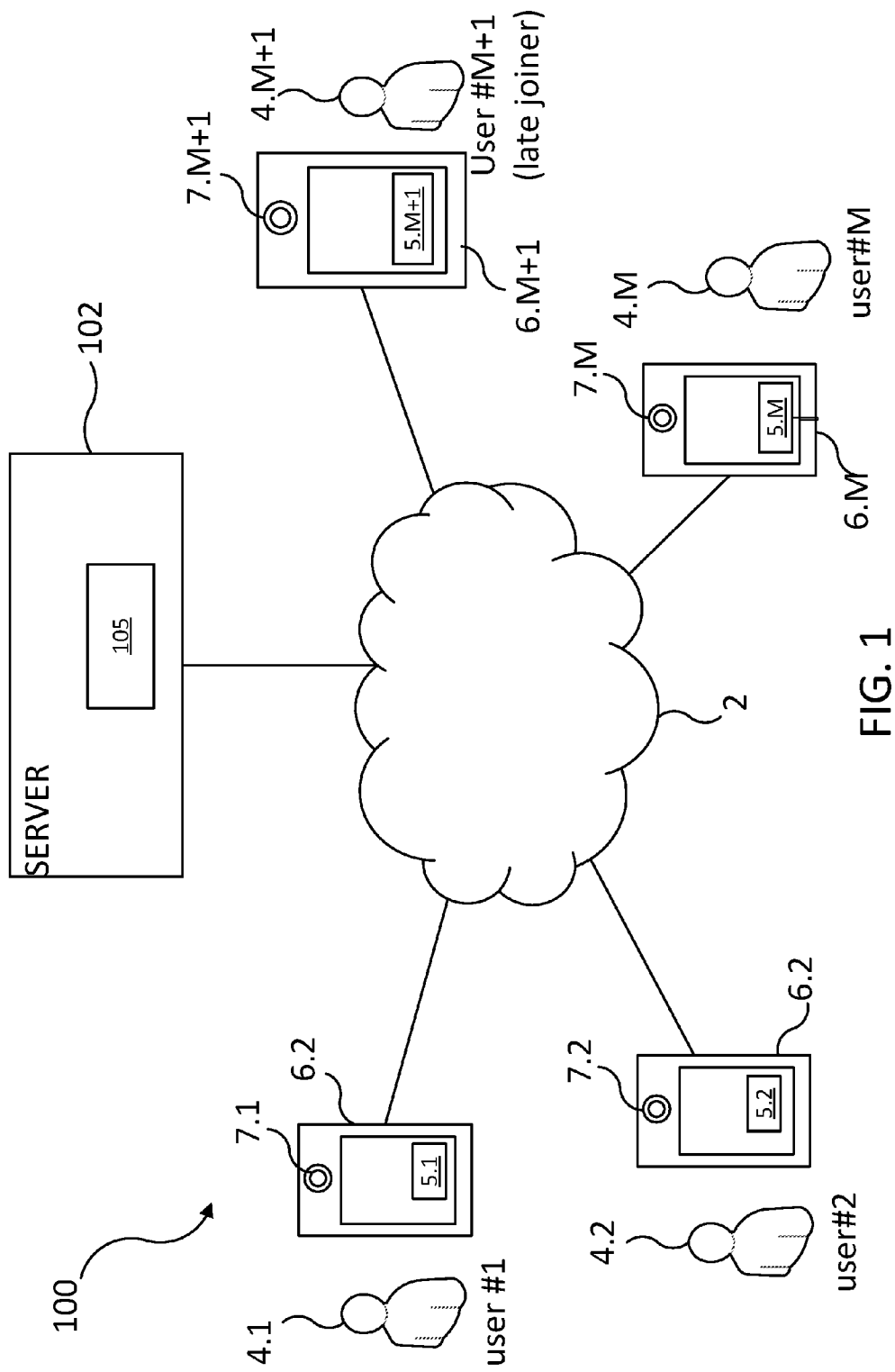
FIG. 1 shows a schematic block diagram of a communication system.

In a communication event conducted between users (participants) via a communication network, such as a video call, it may not be desirable to display, to a given participant, all of the video images of the communication event of the other participants all of the time.

In the examples described below, the video images are call video images i.e. video images of the participants themselves. However, as noted, the invention is not limited to this and all relevant description below pertaining to any call video image applied equally to other types of video images, such as shared content.

For example, where only a few of the users are active, i.e. doing something that may be of interest to other users in the videoconference, and/or if there is a very large number of users on the call. For example, only one or two of the users may be actively speaking, reacting, or doing users at a given time during the call. For example, a single speaking participant may be leading the call at a particular time, or two of the participants may be engaged in conversation at a particular time (whilst the others just listen).

In order to provide a more engaging user experience in such circumstances, it can be beneficial to intelligently limit the number of video images displayed to a given participant or limited number of participants, so as to focus the participant's attention on the "current action" (i.e. those participant(s) who are currently contributing the most to the communication event) based on activity exhibited by the participants during the call.

This intelligent selection and displaying of a limited number of video streams based on participant activity is referred to herein as "follow-the-action storytelling", and guides the consuming participants with the group activity and group response as the communication event proceeds. In the examples described below, when a follow-the-action mode is selected for a given user, the number of video images displayed to that user is limited to one or more, which are intelligently selected in the manner described below. This in turn provides what is referred to herein as a "storied experience view" for each participant, which harnesses the power of video and storytelling to transform a meeting experience (i.e. video call) beyond active speaking via a more engaging and life-like meet up experience.

A set of one of more of the video streams can be selected for each of the participants independently, so as to provide that participant with a unique storied experience tailored to him. For example, the video stream(s) for a participant who is currently speaking may be different from that or those selected for a participant who is not speaking.

The video streams to-be displayed in follow-the action storytelling can for example be selected based on associated audio data, in order to identify and display the video stream(s) of the participant(s) who are currently speaking, reacting, or doing.

In some embodiments, this may be the only consideration when implementing follow the action storytelling. However, in other embodiments, weight can be given to other factors in selecting the video streams to be displayed in the follow-the-action mode. For example, a user may be interested in a non-verbal event associated with one or more of the other users. This can include an event such as a detected change in the number of users that are present in the video image received from a particular user device. It may be desirable to display this kind of event to a user, in addition to, or in place of, the video images associated with verbal-events. That is, call video images for display may be selected based on their visual content, or various activity detection as well as or instead of any voice data associated with those images. In so doing, a user can view the activity of the other users in the video call (be it verbal or non-verbal) in a story-like manner. It may be desirable to display non-verbal events for a limited time interval; for example, to ensure that a user's focus is not taken away from a speaking user for too long.

As another example of a non-verbal event that can trigger the selection of a video stream is a change in the facial expression of one or more of the other users, which may have occurred as a result of one of the users reacting to a speaking user's speech. It may be desirable to display one or more of these reactions, as and when they occur, so as to enable a user to view the activity of the other users in the video call, in a story-like manner. Likewise, these reactions may also be displayed for a limited time interval; for example, to ensure that a user's focus is not taken away from a speaking user for too long.

Examples of follow-the-action story telling based on non-verbal cues are described in the Applicant's co-pending U.S. patent application Ser. Nos. 15/048,800 and 15/048,750, both of which are incorporated herein by reference in their entirety.

There are additional advantages to follow-the action story telling. As well as providing an improved user experience, follow-the-action storytelling also ensures that the user device does not allocate display resources to video data that does not add to the user's experience of the video call, which is particularly, though not exclusively applicable, to mobile, tablet or certain laptop devices within limited available total display areas. Moreover, in preferred embodiments of the present invention, the video streams carrying the video images are transmitted to a central relay node, for example a relay server or a user device of one of the participants which is hosting the video call. The relay node selects one or more of the streams to be displayed to each participant, and transmits only those stream(s) to that participant (where the relay node is a user device, at least one of the streams eligible for selection can be generated local at that user device). That is, only as many video streams are needed are transmitted to each participant. This saves bandwidth whilst at the same time improving the user experience.

Notwithstanding, the inventor of the present invention has recognized that, whilst follow-the-action storytelling can provide a highly engaging experience for users in many circumstances—by focusing-in on the current action wherever that may be—there are certain circumstances in which an alternative user experience may in fact be more engaging. In particular, he has recognized that a participant who is late to join a video call (late joiner), i.e. when multiple participants have already joined and have been conducting the conference for some time, may not benefit fully from follow the action storytelling initially.

The described embodiments of the present invention provide the late joiner at his user device—for an initial duration commencing upon his joining (start phase)—with what is referred to herein as a start storied phase experience, which is unique to that late joiner.

Detection of a remote participants "late to join" status instigates this start storied phase experience, in which a start phase multi grid introduction to the current participants multi modal experience is provided at his user device, so as to increase the late joiners awareness of attendees, locations and current activities. Upon expiry of the initial duration, his user devices switches to a follow the action story view phase, bringing his experience into line with that of the existing participants.

In other words, when a late participant first joins a video call, a late-to-join mode (introductory mode) is selected for an initial duration for that participant. In the late-to-join mode, the focus is on providing the late joiner with a full and comprehensive overview of the current state of the call. For example, video images of all (or the majority) of the participants may be displayed to the user, even in-active participants who are not currently part of the action, i.e. who are not currently active speakers and who are not driving the call with non-verbal cues. This improves activity and people engagement/awareness by giving a visual overview of all people and activity currently progressing in the call. In addition, avatars may be displayed in this initial duration representing any participants who are unable to provide video streams, for example because their user devices lack the necessary capability of because they are operating under restricted network conditions, this is an effective means of drawing the late joiner into the call.

After the initial duration, a follow-the-action mode (focused engagement mode) is selected for the late joiner, so that for a subsequent duration a limited number of video images is selected intelligently and displayed to him, bringing his experience into line with the existing participants. Thus, allowing the late joiner that is now—activity and group aware—to participate in the group activity at an equal engagement follow the action behaviour level of awareness.

The initial duration (i.e. late-to-join phase) may be several seconds (at least two seconds, and possibly more—e.g. five to ten seconds). The subsequent duration (i.e. the follow-the-action phase) will typically last longer in practice, e.g. at least a minute.

FIG. 1 shows a communication system 100 comprising a network 2, to which a relay server 102 and a plurality of user devices 6.1, . . . , 6.M+1 (M+1 in total) are connected. The user devices and the server are nodes of the network 2. Each of the user devices 6.m (where m denoted the mth user device) is operated by a respective user 4.m.

The users 4.1, . . . , 4.M+1 are participants in a video call conducted via the network. User M+1 is a late joiner who has joined the call after users 4.1, . . . , 4.M, who are existing participants of the call at that time.

Each of the user devices 6.m has at least one image capture device 7.m (camera), for use in capturing a video image of user 4.m that is transmitted from that user device 6.m to the network 2 in a video stream of the video call.

Each of the user devices 6.m comprises a processor 5.m, such as a CPU or CPUs (e.g. in a multi-core processor), on which an instance of a communication client is executed. The communication client establishes the necessary connections over the network 2 to allow the users to participate in the video call using the user devices.

The communication client on each user devices 6.m generates at least one video stream for transmission via the network 2 as part of the video call. The video stream carries a moving image generated using the at least one camera 7.m of that user device 6.m, by applying video encoding to video data captured by the camera 7.m.

The network 2 is a packet-based communication network, such as the Internet.

The users 4.1, . . . 4.M+1 are users of the communication system 100. The communication system 100 may have other (possibly many) users who are not shown in FIG. 1. Whilst in FIG. 1, each user device is operated by one user, in some cases at least one of the user devices may be operated by multiple users. That is, multiple users may participate in the video call using the same user device, which can for example be a video conferencing device. Moreover, not every user device in the call needs to have a camera—that is, there may be additional users operating additional user devices and participating in the video call even if their user devices lack a camera, or lack the capability to provide a call video stream for some other reason, for example because they have limited available network bandwidth.

Moreover, whilst each user device 6.m is shown as having one image capture device 7.m, one or more of the user devices 6.m may have one or more additional camera devices allowing multiple video streams to be generated and transmitted from that device. The additional camera device can for example provide an alternative angle or view (e.g. wide-view) from which to capture a video image of the user(s). Moreover, at least one of the user devices may generate multiple video streams using the same camera. For example, a single camera may generate multiple video streams, each derived from a different region of a high-resolution master video image captured with a single camera.

In any event, N video streams are generated by the M user devices having video-stream capability. In the simplest case, N=M (one stream per user device with video capabilities), but as noted in other cases N>M (multiple streams generated by at least one user device, from the same or different cameras). The N video streams are denoted s1, . . . , sN below. In this example there are M participants (one per device), however in other cases there can be more participants than user devices (when multiple users are using at least one of the devices), or even fewer participant that user devices (where one participant is using multiple devices). M may be the total number of user devices, or there may be at least one additional user device in the call which lacks such video stream capability.

In the following examples, the number of streams N is at least four and may be considerably higher for a video call with many participants.

In the described examples, the video streams are transmitted to a relay node, which can be the relay server 102. Alternatively, it can be one of the user devices 6.1, . . . , 6.M, e.g. the user device of the participant who is hosting the video call, which in some implementations is automatically the participant who instigated the video call.

Figure 2:
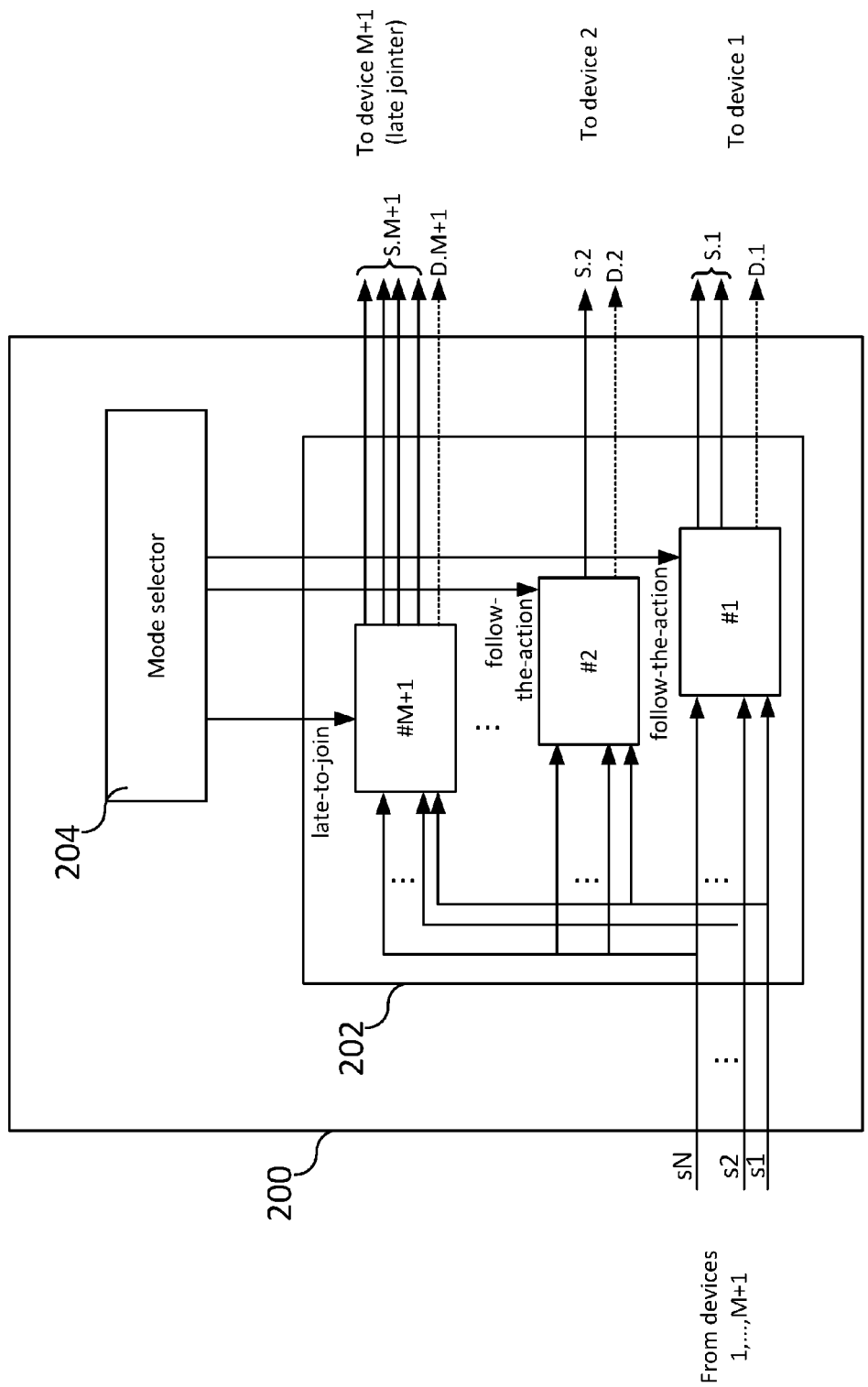
FIG. 2 shows a functional block diagram of a relay node.

FIG. 2 shows a functional block diagram of a media relay system 200, which represents functionality implemented by the really node.

Where the relay node is the server 102, this functionality can be implemented by server code executed on at least one processor 105 of the relay server 120. That is, server code executed on one processor, or whose execution is distributed across multiple processors. The multiple processors can be part of one computer device, or multiple computer devices which may or may not be spatially collocated. For example, the relay server 102 may be implemented in a cloud computing environment, wherein its functionality is implemented by one on more virtual devices, which in turn run on one or more physical computer devices which can be in the same or different data centres where there are multiple computer devices.

Where the relay node is one of the user devices themselves, the functionality of the media relay system 300 is part of the functionality of the communication client executed on the processor of that user device.

Each time a new participant joins the call, a notification of the new participant is received at the relay node. This can for example be triggered by the detection of an initial receipt of at least one video stream from the new participant at the relay node.

The media relay system 300 receives the N video streams s1, ..., sN from the M devices 6.1, ..., 6.M. When the relay node is the server 102, these are all received via the network 2 from the user devices 6.1, ..., 6.M. When the relay node is one of the user devices, at least one of those streams may be generated locally at that user device and the rest received via the network 2 from the remaining user devices.

The system 200 is shown to comprise functional modules representing different parts of the system's functionality, namely a stream selector 202 and a mode selector 204 which operates as a controller of the stream selector 202. Blocks #1 to #M (M in total) of the stream selector 202 denote individual stream selection functionality for the user devices 6.1, ... 6.M. That is, a set of one or more of the streams s1, ..., sN is selected for each of the user devices individually, where S.m denotes the set of stream(s) selected for device 6.m operated by user 4.m. This allows each participant to be provided with a unique experience tailored to him.

Mode selector 204 selects a mode for each of the user devices 6.m depending on when its user 4.m joined the video call. In this example, the system 300 is shown at a time when the follow-the-action mode is selected for each of the existing participants 4.1, ... 4.M, whereas the late-to-join mode is selected for the late joiner 4.M+1 who has recently joined the call.

The late joiner 4.M+1 can be identified as such by mode selector 204 based on a time at which he joins the communication event. For example, based on an elapsed time of the communication event that the join time (i.e. how long it has already been going on for), the number of exiting participants M at that time (i.e. how many people have joined before him), some other late-to-join condition, or any combination thereof.

User device 6.m is configured to display a user interface (500—see below), which is controlled to operate in the mode selected for that device 6.m.

For each of the existing participants 4.1, ... 4.M, the selection of the follow-the-action mode causes between one or two streams to be selected for displaying to that user, by blocks #1, ..., #M respectively, in accordance with the follow-the action principles set up above. In addition, display data D.1, ..., D.M is generated by that block a layout for displaying the video image(s) carried by those selected stream(s) at the relevant user device, in the manner described below.

For the late joiner 4.M+1, the late-to-join mode remains selected for an initial duration after his joining. The selection of the late-to-join mode causes a greater number of streams (between three and four) to be selected for that user at a given time whilst that mode remains selected. Display data D.M+1 defining a layout for displaying the selected streams S.M+1 is also generated.

Each participant's own video stream(s) is not transmitted back to him over the network 2, thus the total number of video streams eligible for selection for the late joiner 4.M+1 is N less the number of the late joiner's own video streams (if any—as noted, not every participant need to have video capture capabilities). For example, if one of the streams is the late joiner's, then there are N−1 eligible for selection for displaying to the late joiner.

Although not eligible for selection in this manner, a self-video image of the late joiner's own call video may be locally displayed at his device, for example in a corner of the display area in a conventional manner. The same goes for the other participants. The "me" video (i.e. self-image) of the user's own video is displayed in the grid when "pinned" by the user or constrained to the grid on mobile devices.

For each participant 4.m, the set of stream(s) S.m selected for that participant is transmitted to that participant's user device 6.m along with the display data D.m via the network 2. An exception to this is when the relay node is one of the user devices, in which case the streams selected for that user device are outputted locally instead without needing to be transmitted via the network 2.

Figure 3:
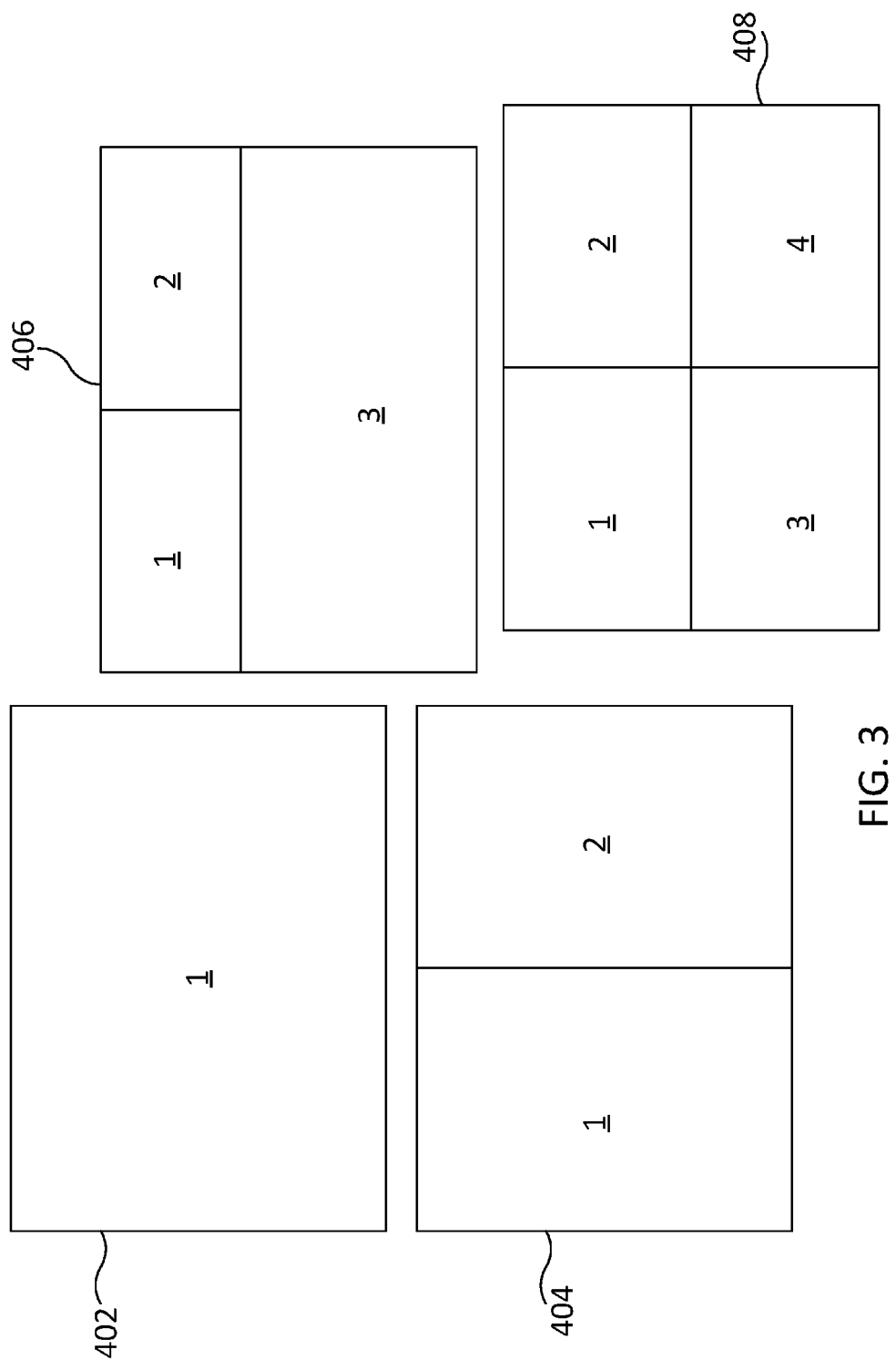
FIG. 3 shows a set of selectable predetermined call video layouts.

The selected stream(s) S.m are displayed at user device 6.m according to one of four pre-determined layouts 402 (one stream), 404 (two streams), 406 (three streams) and 408 (four streams), which are illustrated in FIG. 3.

Layout 402 has only one display region for displaying only one call video image at a time, which occupies all of a call video display area of a display of user device 6.m. The call video area can be the whole of an available display area of the display, or a portion of the available display area currently reserved for call video (or more generally video of the communication event).

Layout 404 has two display regions for displaying two call video images at a time (i.e. simultaneously) such that each occupies half of the call video display area. These are displayed side-by-side in this example, but could alternatively be displayed one-above-the other.

Layout 406 has three display regions for displaying three call video images at a time such that one of call video images occupies a greater portion of the call video display area than each of the other two images. That is, one of the call video images is displayed in larger display area than the other two. Each of the other two images occupies half of the remaining call video display area.

Layout 408 has four display regions for displaying four call video images at a time in a two-by-two grid arrangement, with each occupying a quarter of the call video display area.

Layouts 406 and 408 (three and four streams) are used only for the late-to-join mode, whereas layouts 402 and 404 (one and two streams) are used only for the follow-the-action mode.

FIGS. 5A-5D shows a portion of graphical user interface 500 of the client application, which is rendered in a display area 502 of the display of user device 6.m, in order to display the selected stream(s) S.m according to the received display data D.m within the display area 502. In each of FIGS. 5A-5D, the user interface 500 is shown operating in a different one of four call video layout modes, in which to layouts 402, 404, 406 and 408 respectively are rendered by the user interface.

Figure 4A:
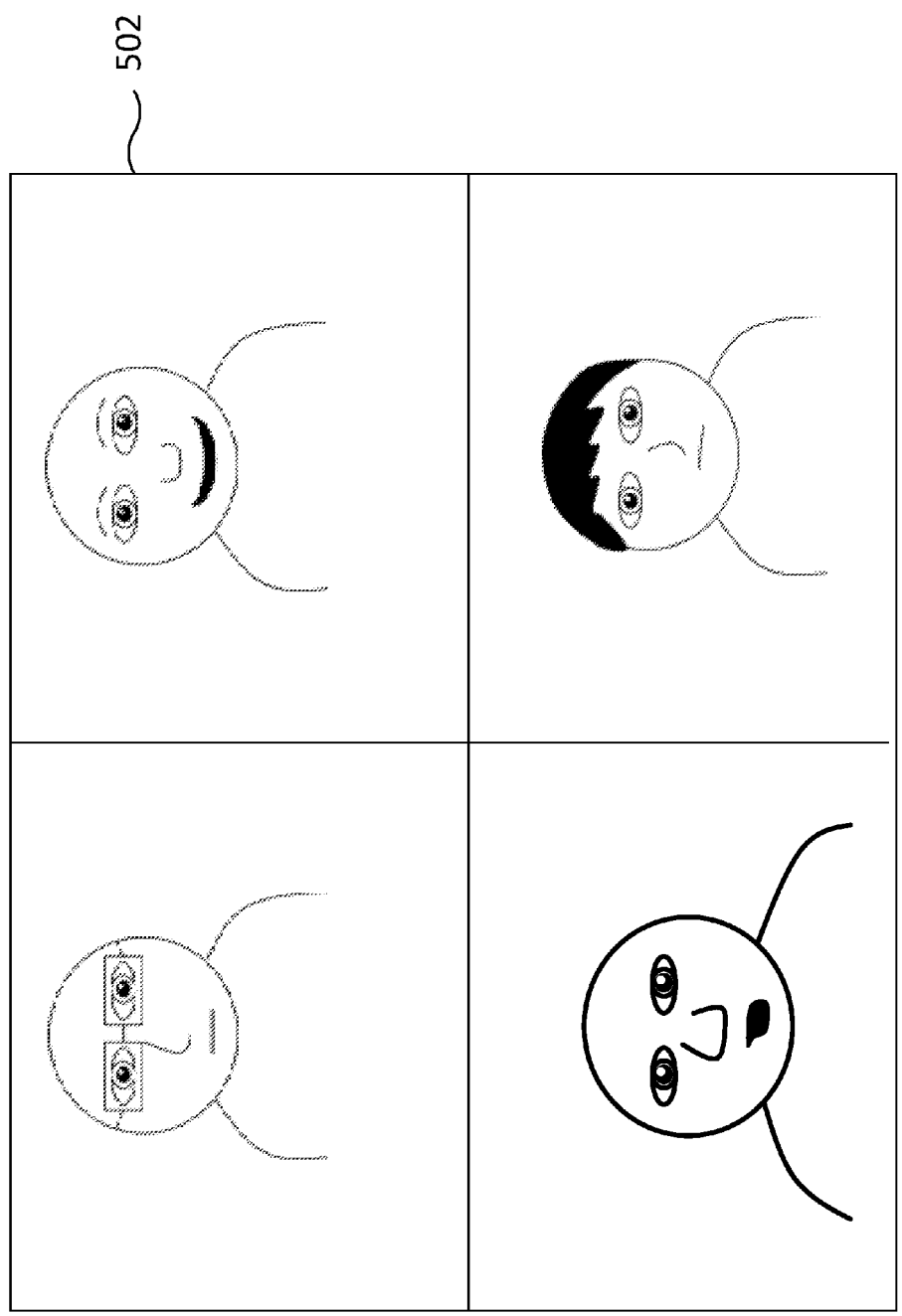
FIGS. 4A to 4D show various illustrations of a graphical user interface (GUI) of a client operating in different call video display modes.
Figure 4B:
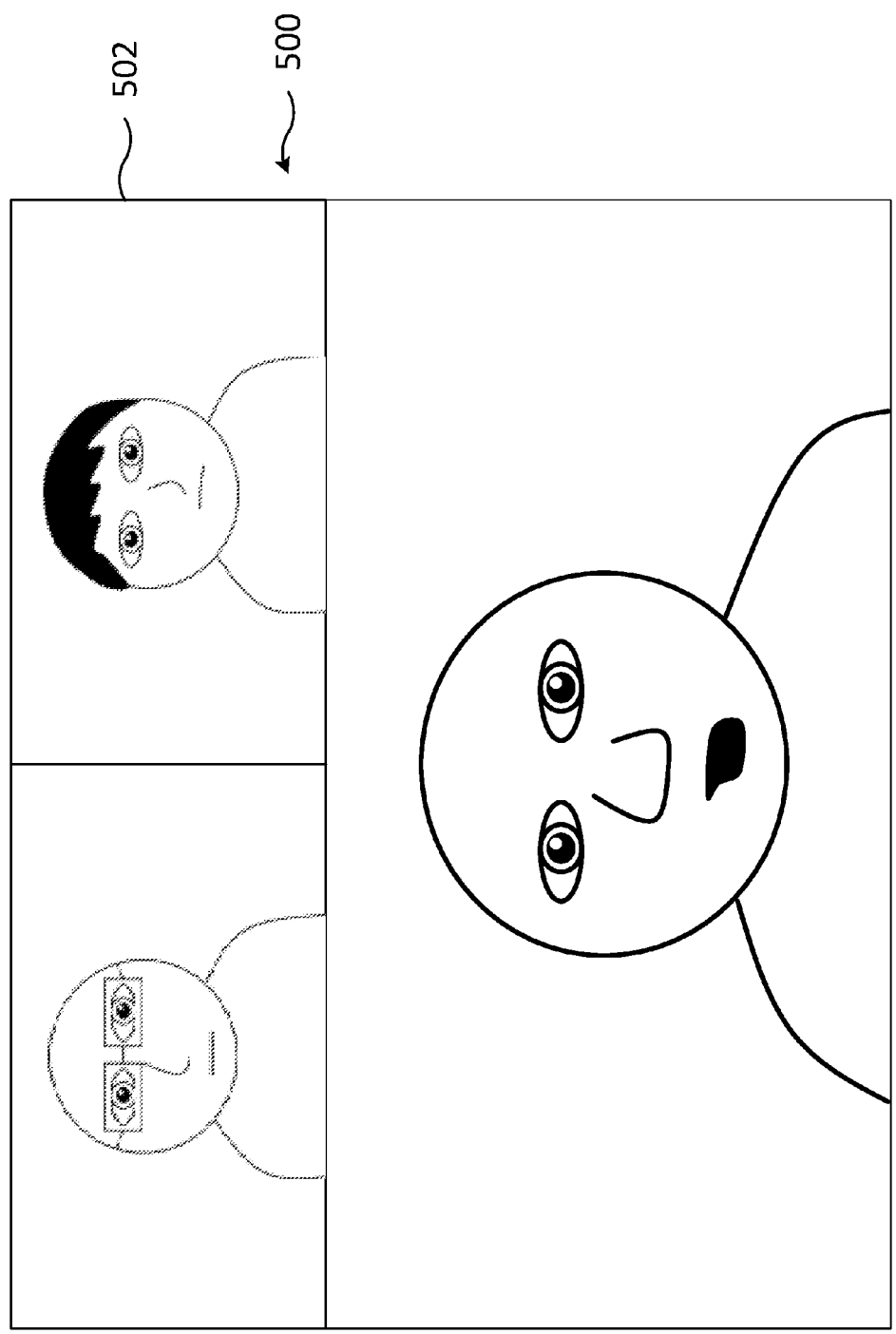
Figure 4C:
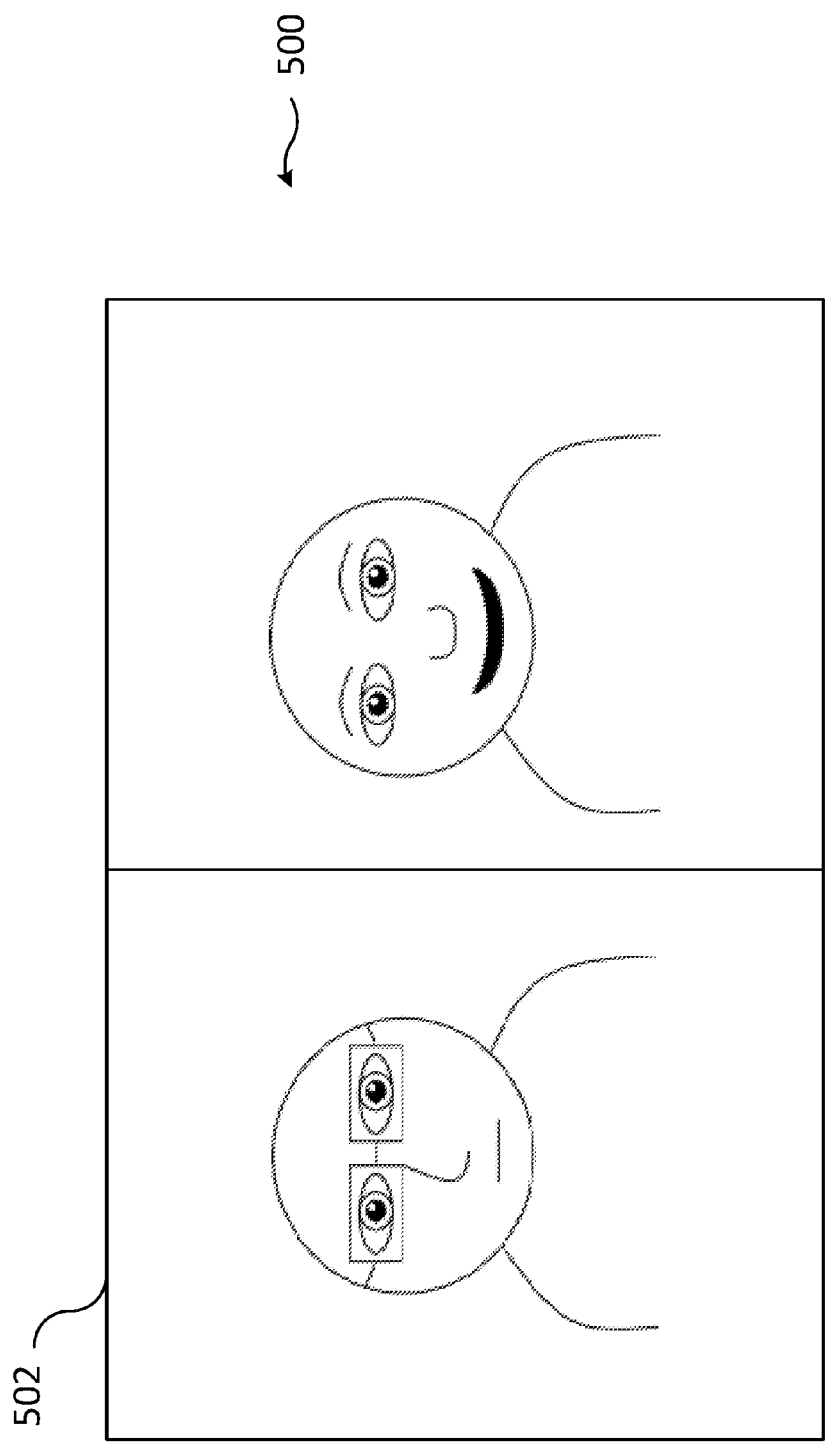
Figure 4D:
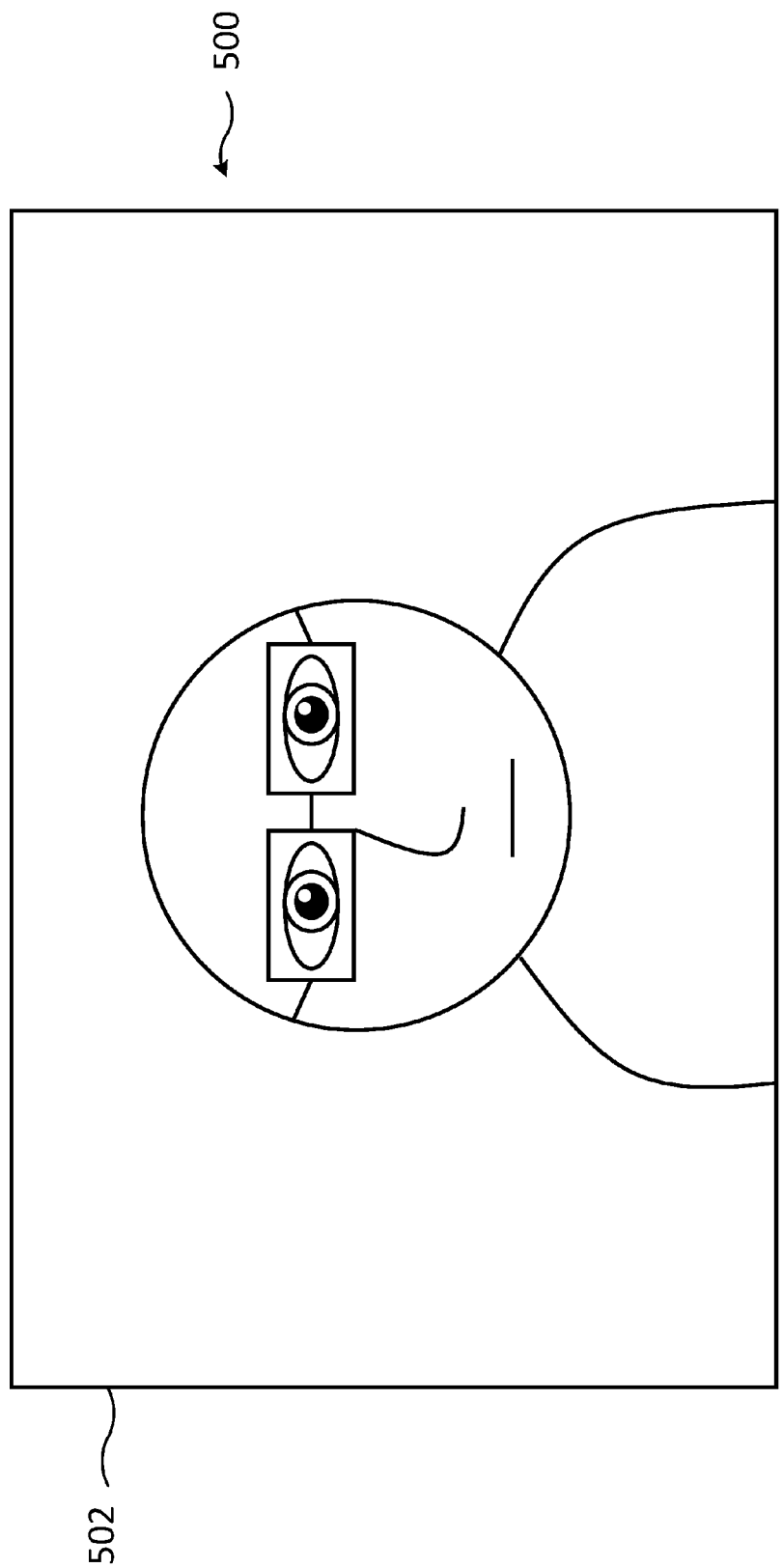

Denoting the number of call video images displayed simultaneously at time t as Q(t), it can be seen that:

Q(t)=1 at any time t at which layout 402 is selected (as in FIG. 4D);

Q(t)=2 at any time t at which layout 404 is selected (as in FIG. 4C);

Q(t)=3 at any time t at whish layout 406 is selected (as in FIG. 4B);

Q(t)=4 at any time t at which layout 408 is selected (as in FIG. 4A).

Figure 7A:
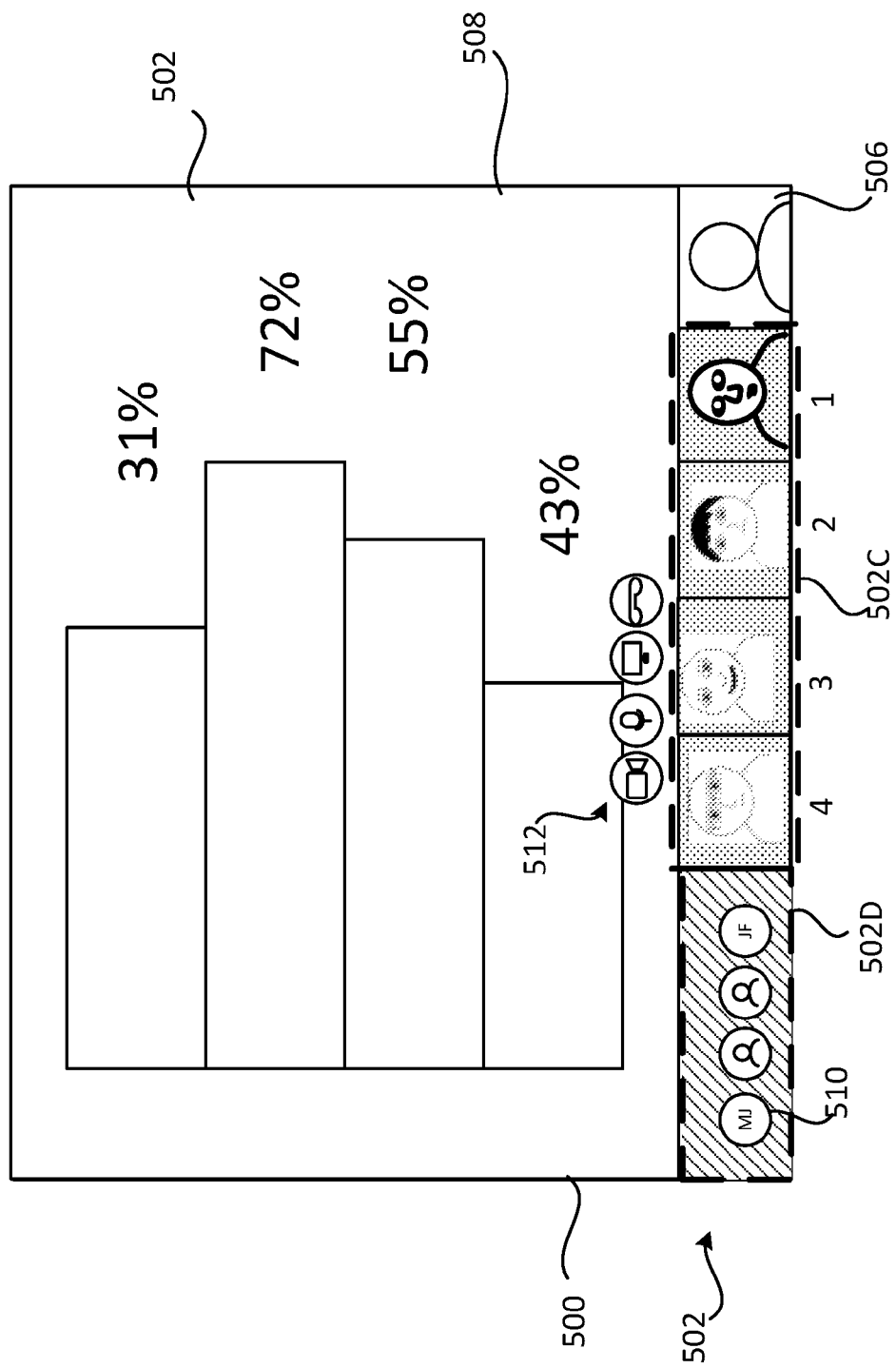
FIGS. 7A and 7B show a staged-content client GUI, operating in late-to-join and follow-the-action modes respectively.
Figure 7B:
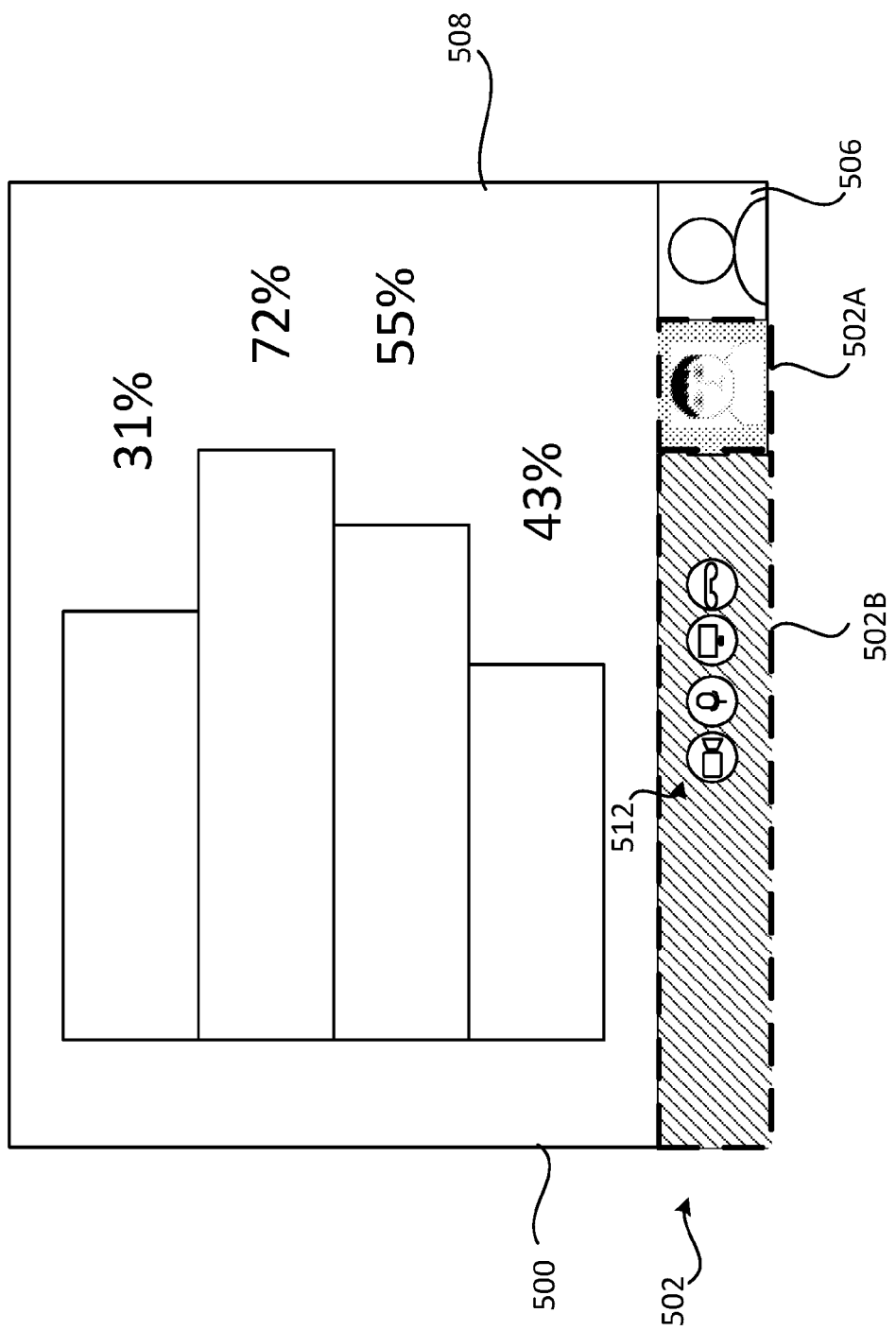

For example, when operating in a persistent stage view mode, content in "stage" plus four active video positions and me (i.e. the participant's self-image) is a core view we design for as well. That is, (up to) four call video images in the call video display area, a self-video image and a (shared) content video image (outside of the call video display area) are displayed simultaneously—an example is shown in FIGS. 7A and 7B, and describe din further detail below.

When operating in a people/content toggle mode, up to four grid videos can be shown in stage while live content can be shown in bottom row with me and passive participants. Thus a passive way to show content as a participant as well.

As noted above, embodiments of the present invention can provide what is referred to as a content-as-a-participant experience, wherein one or more active content views can populate one or more of the available grid views depending on user or system designated importance. For example, if current activity is detected in a shared document or if a shared desktop is active in the grid views a late to join curated view can populate such activity like a person video stream.

By selecting, for the late joiner 4.M+1, only layouts 406 and 408 for the initial duration in which the late-to-join mode is selected, a minimum and a maximum number of call video images is thereby selected for that duration, which are three and four respectively. Because only those layouts are used for the initial duration, the total number of simultaneously displayed call video images remains between three and four inclusive at all times during the initial duration. However, in other implementations this can be relaxed, and all four layouts may be eligible for selection in the late-to-join mode.

Likewise, by selecting for the late joiner 4.M+1 only layouts 402 and 404 for the subsequent duration, a minimum and maximum number of call video images is selected for that duration, which are one and two respectively. Because only those layouts are used for the subsequent duration, the total number of simultaneously displayed call video images remains between one and two inclusive at all times during the initial duration. The same goes for the existing participants 4.1, . . . , 4.M when the follow-the-action mode is selected for them.

The call video layout mode for participant 4.m is set by display data D.m, which can for example specify the selected layout and may also specify which of the video streams in the set S.m should be displayed in which regions of that layout.

Over the course of initial duration, more than four of the N streams plus content (where applicable, e.g. in the persistent stage view) may be displayed in total (but no more than four at any one time) according to the three and four video layouts 406 and 408. For example, during a first part of the initial duration the four-video layout may be selected by stream selector block #M+1 for the late joiner, and cycle though the various video streams of the other participants. Once all or most of these have been displayed to the user, model selector block #M+1 may switch to the three-video layout for the final part of the initial duration to provide a seamless transition to the follow-the-action mode. Upon transitioning to the follow-the-action mode, stream selector block #M+1 transitions to two or one video streams, displayed according to the two and one video layouts 404 and 402 respectively.

Any participants who are not providing video streams, may still be represented in the late-to-join mode, for example as avatars displayed simultaneously with the video streams. In some cases, these avatars are only displayed for the late-to-join mode, to provide an initial overview of all participant including those without video, but are not displayed in the follow-the-action mode as they could be distracting in the long run.

Note also that, in some cases, at least some of the video streams may not be generated using cameras. For example, at least one of the video streams may implement another video modality, such as screen sharing, document sharing or a shared whiteboard or note pad. In the late-to-join mode, these can be displayed in the same manner as video streams. In the follow-the-action mode, this may only be displayed if it is currently part of the action, for example the two-video layout may be used to shown a shared screen or document simultaneously with the video of one of the participants who is giving a presentation on it. To implement this, each video stream may also carry a modality indicator, which is used to select the stream(s) S.m for displaying in dependence on the current mode for block #m of stream selector 202.

The displaying of the greater number of video streams during the initial duration may require more bandwidth, as more video streams have to be transmitted from the relay node to the new participant's user device 6.M+1 (as compared with follow-the-action story telling). However, this additional bandwidth is only needed for as long as it takes to immerse the new participant 4.N+1 in the video call, at which point bandwidth can be saved by switching to the follow-the action mode, thereby reducing the number of video streams transmitted to him without impacting on his user experience. The switch takes place automatically, in response to expiry of the initial duration. This can be a predetermined duration or determined dynamically in dependence on the communication event. In any event, the switch takes place automatically based on a duration timer.

Figure 5:
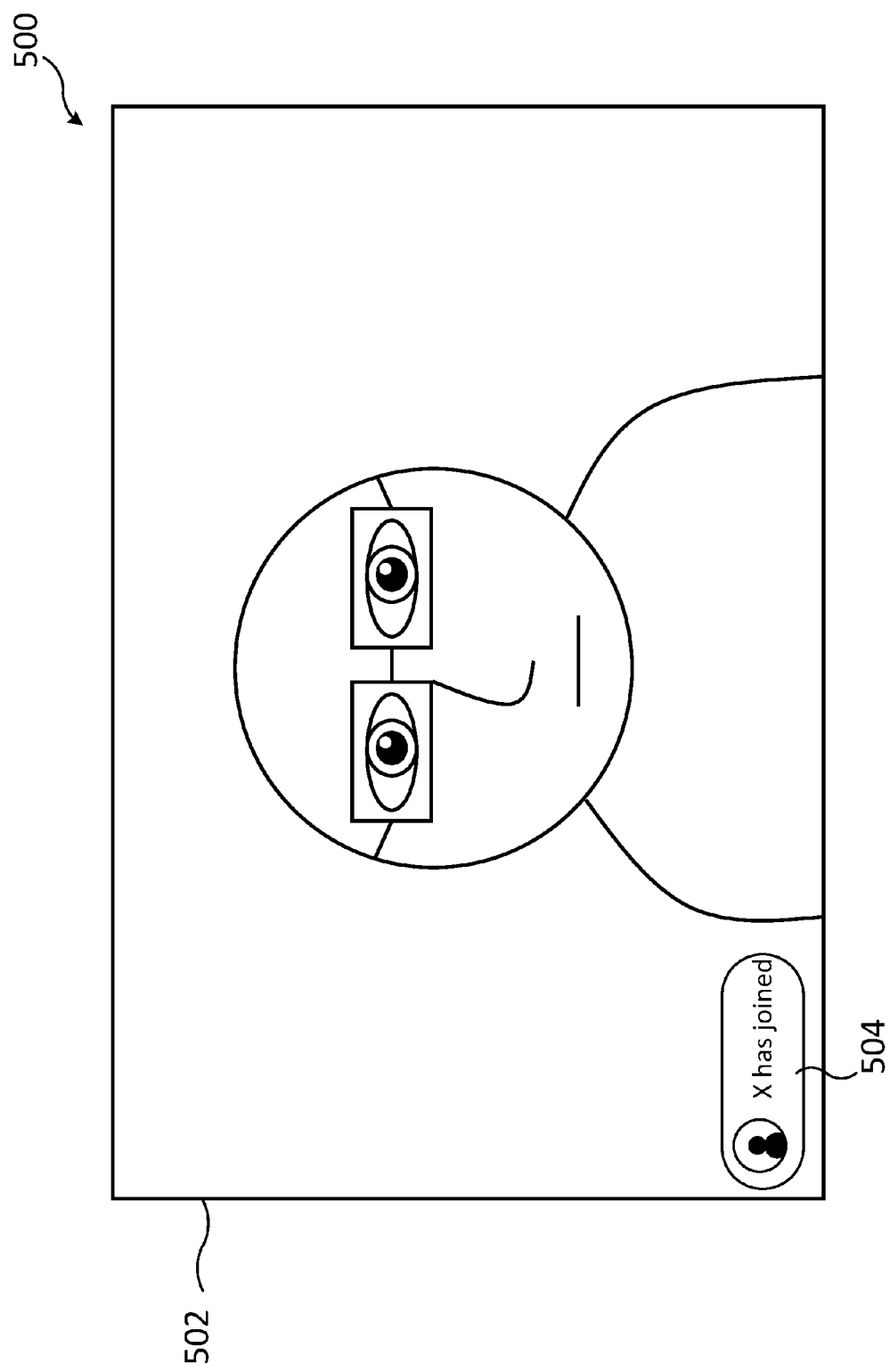
FIG. 5 shows a client GUI which includes a visual notification of a late joiner.

As shown in FIG. 5, for the existing participants 4.1, . . . 4.N in the follow-the-action mode, a visual notification 504 of the new joiner is briefly displayed on the user interface 500. This keeps them informed of new joiners, without being overly distracting.

The visual notification 504 can for example comprise an avatar or image of the new joiner captured with his camera.

Figure 6A:
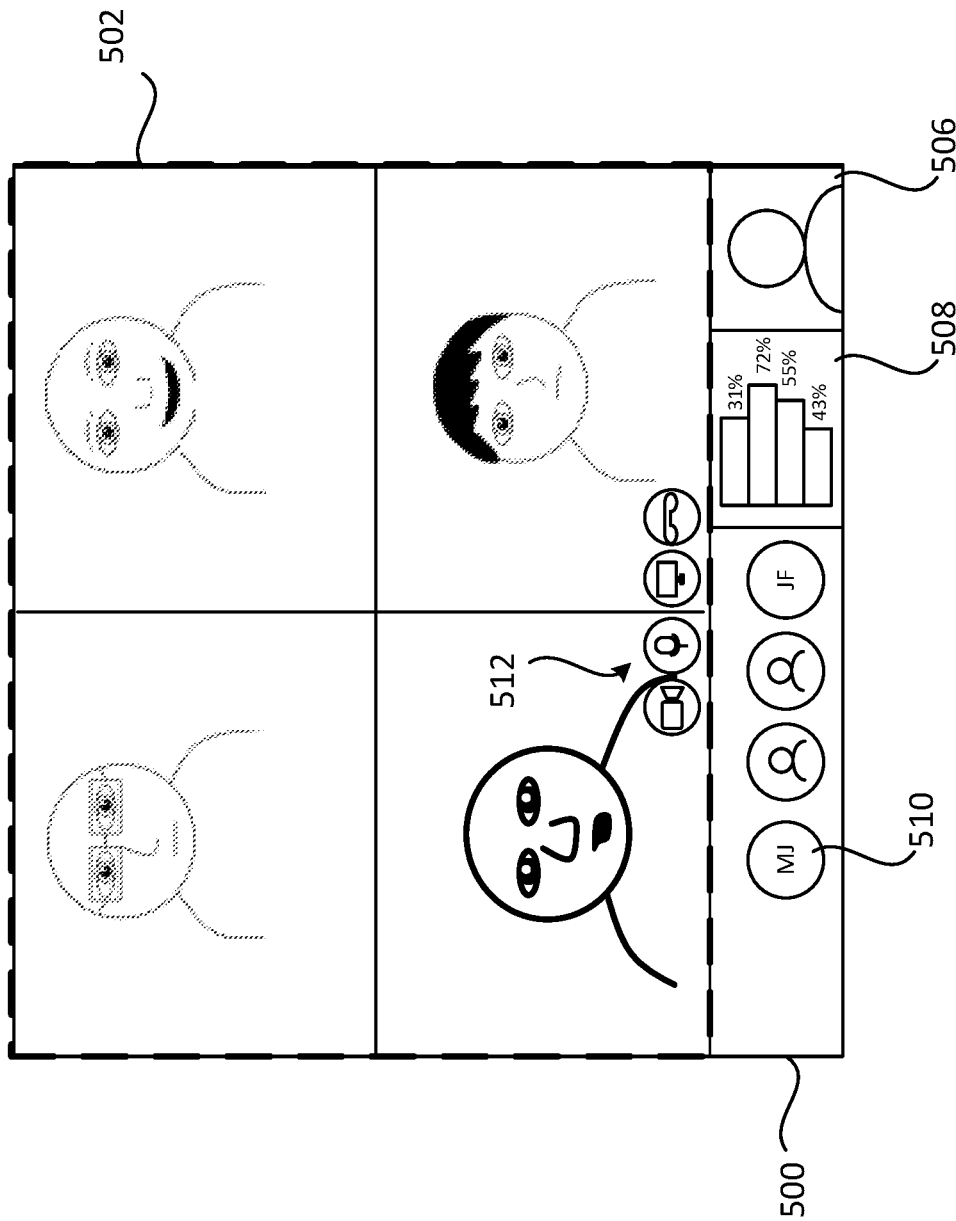
FIG. 6A shows a first example of a client GUI.

FIG. 6A shows a first example of the client GUI in greater detail. As can be seen in FIG. 6A, the display area 502 in which the selected video stream(s) are displayed is only a portion of the display area. Outside of this portion 502, another portion of the client GUI is displayed, which comprises a self-video image 506 of the user 4.m of device 6.m, a shared content video-image 508 (which the user 4.m may for example be sharing himself), avatars 501 representing other call participants. Function buttons 512 for the call are also displayed within the display area 502 in this example. That is, GUI elements that are selectable to instigate a particular function relating to the communication event, such as terminating the call, muting or unmuting a microphone of user device 6.m, enabling or disabling an image capture device of user device 6.m (so as to instigate or terminate the transmission of a video stream to the other participants), and/or enabling or displaying screen sharing from user device 6.m.

Note that, in addition or as an alternative to the avatars 501 outside of the display area 502, at least one avatar may be displayed within region 502 for at least part of the late to join phase, instead of a video image derived from one of the video streams. In this case, the total number of images (i.e.

avatar plus video images) within the display area 502 is dictated by the selected layout.

Figure 6B:
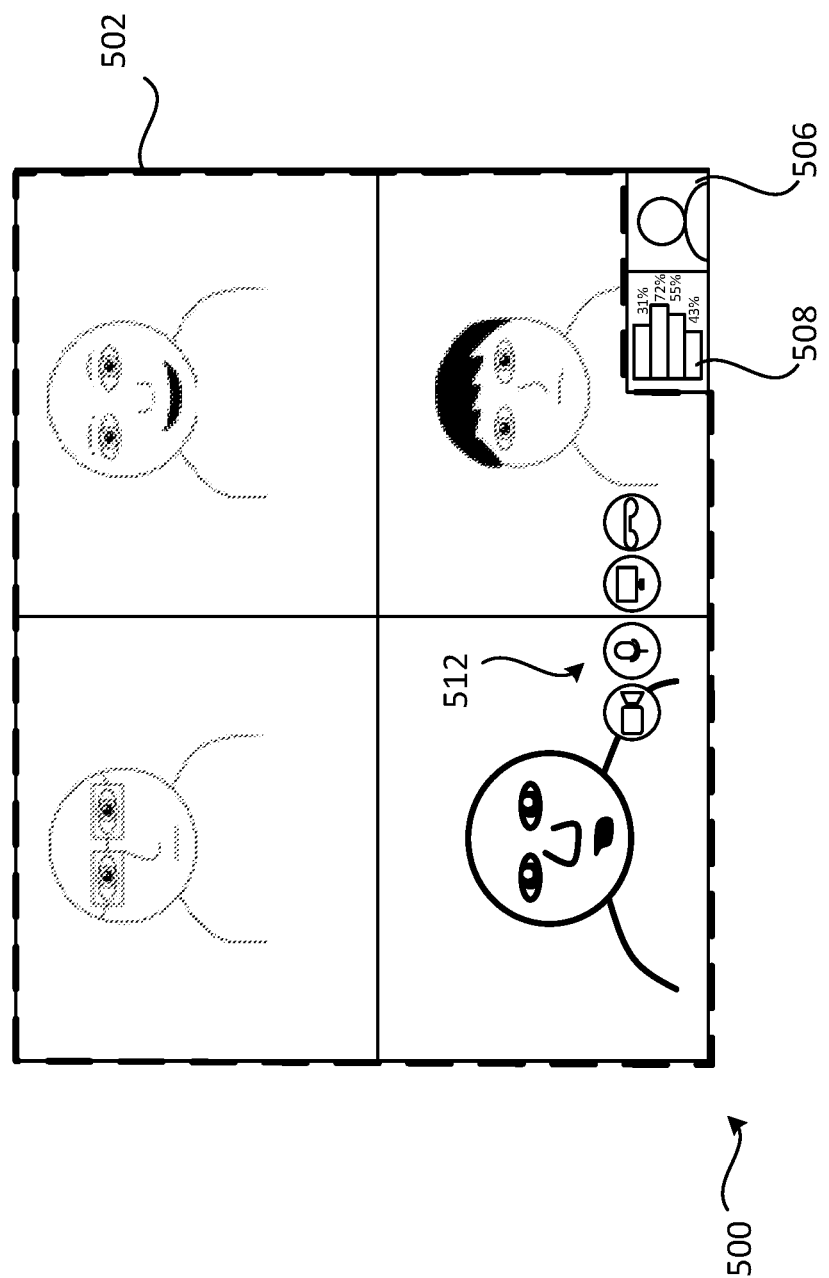
FIG. 6B shows a second example of a client GUI.

FIG. 6B shows a second example of a client GUI which is the same as that of FIG. 6A, other than the fact that display area 502 in which the selected video stream(s) are displayed is non-rectangular, in order to accommodate the self-video image 506 and shared content 508 at one corner of the GUI. The avatars 510 are not displayed in this example.

FIGS. 7A and 7B show an alternative "staged content" configuration of the client GUI 500 when operating in the late-to-join mode and follow-the-action mode respectively. In this example, the shared content 508 takes "centre stage" i.e. is displayed is a large portion of the total available display area, which may be appropriate where the content is the focus of the conference. The display area 502 is a smaller portion of the total available display area, below the shared content. In the late to join mode (FIG. 7A), four call video images are shown displayed in the display area 502 along with avatars. The function buttons 512 are displayed outside of the display area 502, within the larger portion of the total display area in which the shared content 508 is displayed, such that they are overlaid on the displayed content 508. The self-video image 506 is also displayed outside of the display area 502, towards one corner of the GUI 500. By contrast, in the follow-the-action mode (FIG. 7B), only one call video image is shown displayed within the same display area 502, and the avatars are not displayed. This frees-up space within the display area 502, which is exploited by moving the function buttons 512 such that they are now displayed within the display area 502. The self-image 506 and the content 508 are displayed at the same locations on the display.

Sub areas (sections) 502A-B and 502C-D of the display area 502 are marked in FIGS. 7A and 7B respectively, and visual information of the GUI 500 is displayed within these sub-areas as set out below.

FIG. 7A:

502C: Dominant activity video position 1-4 (i.e. four video position within 502C, eac occupying an equal portion thereof) which populate from right to left for dominant activity or dominant speaking. Once populated passive participants in section 502D (see below) can be promoted into the active stage positions of 502C via activity duration timer detection, by swapping that participant with the least active stage position participant currently in 502C (who in turn is demoted to passive section 502D). That is, display a call video image of the promoted participant in 502C in place of the demoted participant's, and displaying an avatar of the demoted participant in 502D. Participants can be video or audio only avatar representations.

502D: Passive activity grid: an area for passive participant avatar representation to give awareness of meeting size or show pre-promotion activity representation (active speaking prior to promotion to dominant activity view. Populates from right to left and with overflow in large meeting experiences. Representations of transition activity are shown for: join/leave, stand/sit. Speaking, Expressions, attribute states, etc.

FIG. 7B:

502A: Dominant activity video position: one video at a time is promoted at a time for follow the action dominant activity and/or dominant speaking. Participants can be video or audio only avatar representations.

502B: Passive activity grid. Area for passive participant avatar representation to give awareness of meeting size or show pre-promotion activity representation (active speaking prior to promotion to dominant activity view. Populates from right to left and with overflow in large meeting experiences. Representations of transition activity are shown for: join/leave, stand/sit. Speaking, Expressions, attribute states, etc. If passive participants occupy grid zone 502B, call controls 512 bump vertically over lower content grid during user control on state. In other words, although not shown in FIG. 7B, avatar images can be displayed in area 502B; however, the number of video images in the area 502 is limited to (in this case) one.

Note that each avatar image displayed in passive regions 502B/502D occupies a smaller portion of the display area that any avatar image displayed in active regions 502A/502C.

The shared contend 508 can for example be a screen share video image, or shared document video image.

A consequence of the above regime is that fewer call video images are displayed by the new participant's user device 6.M+1 at any one time during the subsequent duration than at any one time during the initial duration. In other words, adopting the Q(t) notation defined above:

$$Q(t1) \geq Q(t2)+1$$

for every single time t1 in the initial duration and every single time t2 in the subsequent duration, where "≥" denotes strictly greater than or equal to. This hold true even when the video call has at least as many participants, whose user devices do have video capture capability, throughout the subsequent duration as for the initial duration. That is—denoting the number of participants in the communication event whose devices have video stream capability at time t as P(t)—even when:

$$P(t1) \leq P(t1)$$

for every single time t1 in the initial duration and every single time t2 in the subsequent duration. In other words, the number of call video images displayed to the late joiner is not decreasing because the number of participant's operating user devices with video-stream generation capabilities is decreasing, but is decreasing as a deliberate choice independently of this. For example, all of the existing participants who are participants when the late joiner joins may remain participants throughout the initial and subsequent durations.

However, as noted in other implementations, the restriction on the late-to-join mode may be relaxed, allowing all four layouts to be selected—and hence between one and four images/avatars to be displayed din the grid view—in the late to join mode.

For example, in the late-to-join mode, there may be a default grid view that would be utilized a large percentage of the time, and all stage grid views 1-4 may be available for the late to join experience, that are populated by people, groups or content. The selection logic (mode selector 204) is not constrained to just one of these grids only in this mode.

When a passive avatar row is created and populated from right to left in the bottom row next to the live stage videos, dominant speaking video, or me video to the left, an "overflow" position may be created in the furthest left position in the event of large meetings. This allows for large meetings with more participants than positions available to be represented as +2, +3, +4 and so on in the lower far left passive position . . . . As the conversation unfolds, the most active participants populate in the active and passive individual representation positions via activity points priority stacking. Active and passive positions can be populated by individual, group representation or video.

Note that whilst in the above the streams are transmitted to a relay node for selection, this is not essential. Each user device can for example transmit its stream(s) directly to every other user device, and each user device may perform its own selection of a subset of the received streams to be displayed. Although less preferred in some contexts due to the potentially higher bandwidth requirements (due to transmitting streams that are noting going to be displayed), it may still be viable in other contexts, and has the advantage that no relay node is needed. The burden imposed on the relay node can be high in terms of required processing and bandwidth resources, particularly where it is receiving a large number of streams.

As another example, user device 6.*m* can control which streams it receives based on stream subscription. That is, by subscribing to desired streams from the relay node. For example, the user device 6.*m* may subscribe to the video stream of the actively speaking participant when its user interface is operating in the active-speaker mode, by transmitting at least one active speaker subscription message to a relay node. In some cases, it may only subscribe to that video stream in that mode, at least some of the time. The user device does not need to know who the active speaker is (that can be determined at the relay node); it can simply send a stream subscription request requesting the stream of the active speaker whoever that may be. If the active speaker changes the user device will automatically receive the video stream of the new active speaker without having to alter its subscription.

In the late-to-join mode, the user device may subscribe to all (or some) of the video streams, by transmitting at least one stream subscription message to the relay node, wherein the client receives the subscribed-to video streams from the relay node via the network. More generally, it may send a stream subscription request requesting the video stream of at least one of the participants who is not an active speaker, and receive the subscribed-to video stream at a time when that participant is not the active speaker. Whilst the above has been described with reference to specific examples, other variations are within the spirit and scope of the present invention. The scope is not in limited by the examples described above, but only by the following claims.

The invention claimed is:

1. A method of controlling a user interface of a user device operated by a new participant of an established communication event, the established communication event being conducted between a plurality of existing participants by transmitting and receiving video streams via a communication network between user devices operated by those existing participants, the method comprising steps of:
   receiving a notification of the new participant joining the established communication event;
   determining, based on the received notification, whether the new participant satisfies a late-to-join condition; and
   if the late-to-join condition is determined to be satisfied:
      controlling the user interface to operate in a late-to-join mode for an initial duration, and in response to expiry of the initial duration, controlling the user interface to operate in an active speaker mode instead;
   wherein controlling the user interface to operate in the active speaker mode comprises selecting for the new participant, based on audio data generated at the user device of an actively speaking one of the participants: one of the video streams of the actively speaking participant, or an avatar image representing the actively speaking participant, thereby causing the user interface to display the selected avatar image or a video image derived from the selected stream.

2. A method according to claim 1, wherein controlling the user interface to operate in the late-to-join mode comprises selecting for the new participant one or more of said video streams and/or one or more avatar images independently of any audio data generated at the user devices, thereby causing the user interface to display the selected avatar images or one or more video images derived from the selected video streams for at least part of the initial duration.

3. A method according to claim 1, wherein no more than a maximum number of video images derived from the video streams is displayed by the user interface at any one time when operating in the active speaker mode, and more than that maximum number of video images are displayed simultaneously by the user interface operating in the late-to-join mode at least once during the initial duration.

4. A method according to claim 1, wherein controlling the user interface to operate in the late-to-join mode comprises controlling the user interface to display over the course of the initial duration, for every one of the existing participants, a respective video image derived from one of the video streams or a respective avatar image.

5. A method according to claim 1, wherein the late-to-join condition is based on at least one of an elapsed time of the communication event at a join time of the new participant, or a number of existing participants of the communication event at the join time.

6. A method according to claim 1, further comprising a step of controlling the user interface to operate in the active speaker mode immediately if the late-to-join condition is determined not to be satisfied.

7. A method according to claim 1, wherein the steps are implemented at a relay node other than the new participant's user device.

8. A method according to claim 7, wherein the controlling step is implemented by transmitting from the relay node via the network to the new participant's user device any of the video streams needed by the user interface operating in the active speaker mode to display the video image.

9. A method according to claim 7, wherein the relay node is a relay server, or the user device operated by one of the existing participants.

10. A method according to claim 1, wherein the steps are implemented by the new participant's user device.

11. A method according to claim 10, wherein the user device subscribes to the video stream of the actively speaking participant when the user interface is operating in the active-speaker mode, wherein the user device receives the subscribed-to stream from a relay node via the network.

12. A method according to claim 11, wherein in the late-to-join mode, the user device subscribes to at least one of the video streams of a non-speaking participant wherein the user device receives the subscribed-to video stream from the relay node via the network.

13. A method according to claim 1, wherein the video image is:
   a call video image, derived from one of the video streams, of the actively speaking participant and is selected for the subsequent duration based on the active speaker's audio data.

14. A method according to claim 1, wherein at least one video image is displayed by the user interface operating in the late-to-join mode during the initial duration, the at least one video image being a call video image of a participant who is not actively speaking at that time.

15. A method according to claim 1, wherein different video or avatar images are displayed at different times during the initial duration by the user interface operating in the late-to-join mode.

16. A method according to claim 1 wherein, the user device operated by at least one of the plurality of existing participants of the communication event is, when the new participant joins, not transmitting a video stream;
wherein an avatar image representing the new participant is displayed at the new participant's user device by the user interface operating in the late-to-join mode for at least part of the initial duration, which is not displayed by the user interface when operating in the active speaker mode.

17. A method according to claim 1, wherein at least one of the video streams carries a modality indicator and the method comprises detecting the modality indicator in that stream;
wherein a video image derived from that video stream is displayed by the user interface operating in the late-to-join mode for at least part of the initial duration; and
wherein the detection of the modality indicator prevents any video image derived from that video stream from being displayed by the user interface when operating in the active speaker mode.

18. A network node for controlling a user interface displayed to a new participant of an established communication event, the established communication event being conducted between a plurality of existing participants by transmitting and receiving video streams via a communication network between user devices operated by those existing participants, the network node comprising:
an input configured to receive a notification of the new participant joining the established communication event;
a controller configured to implement steps of:
determining, based on the received notification, whether the new participant satisfies a late-to-join condition; and
if the late-to-join condition is determined to be satisfied:
controlling the user interface to operate in a late-to-join mode for an initial duration, and in response to expiry of the initial duration, controlling the user interface to operate in an active speaker mode instead;
wherein controlling the user interface to operate in the active speaker mode comprises selecting for the new participant, based on audio data generated at the user device of an actively speaking one of the participants: one of the video streams of the actively speaking participant, or an avatar image representing the actively speaking participant, thereby causing the user interface to display the selected avatar image or a video image derived from the selected stream.

19. A network node according to claim 18, which is a relay node or a user device configured to display the user interface.

20. A computer readable storage device storing a computer program product for controlling a user interface displayed to a new participant of an established communication event, the established communication event being conducted between a plurality of existing participants by transmitting and receiving video streams via a communication network between user devices operated by those existing participants, wherein the computer program product comprises code stored on the computer readable storage device and configured when executed to implement the following steps:
receiving a notification of a new participant joining the established communication event;
determining, based on the received notification, whether the new participant satisfies a late-to-join condition; and
if the late-to-join condition is determined to be satisfied:
controlling the user interface to operate in a late-to-join mode for an initial duration, and in response to expiry of the initial duration, controlling the user interface to operate in an active speaker mode instead;
wherein controlling the user interface to operate in the active speaker mode comprises selecting for the new participant, based on audio data generated at the user device of an actively speaking one of the participants: one of the video streams of the actively speaking participant, or an avatar image representing the actively speaking participant, thereby causing the user interface to display the selected avatar image or a video image derived from the selected stream.

* * * * *